(12) United States Patent
Shih et al.

(10) Patent No.: US 11,054,654 B1
(45) Date of Patent: Jul. 6, 2021

(54) NEAR-EYE DISPLAY DEVICE

(71) Applicant: Coretronic Corporation, Hsin-Chu (TW)

(72) Inventors: Chih-Wei Shih, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/807,183

(22) Filed: Mar. 3, 2020

(51) Int. Cl.
*G02B 27/01* (2006.01)
*G02B 27/14* (2006.01)
*F21V 8/00* (2006.01)

(52) U.S. Cl.
CPC ....... *G02B 27/0172* (2013.01); *G02B 6/0028* (2013.01); *G02B 27/145* (2013.01); *G02B 2027/0125* (2013.01)

(58) Field of Classification Search
CPC .................................................. G02B 27/0172
See application file for complete search history.

(56) References Cited

U.S. PATENT DOCUMENTS

| 5,076,664 | A | 12/1991 | Migozzi |
| 6,829,095 | B2 | 12/2004 | Amitai |
| 7,576,916 | B2 | 8/2009 | Amitai |
| 8,810,914 | B2 | 8/2014 | Amitai |
| 10,466,479 | B2 | 11/2019 | Shih et al. |
| 2014/0160577 | A1 | 6/2014 | Dominici et al. |
| 2018/0203236 | A1 | 7/2018 | Shih et al. |
| 2018/0203237 | A1 | 7/2018 | Shih et al. |
| 2018/0335628 | A1 | 11/2018 | Hung et al. |

OTHER PUBLICATIONS

Yaakov Amitai, "P-27: A Two-Dimensional Aperture Expander for Ultra-Compact, High-Performance Head-Worn Displays", SID 05 Digest, May 2005, pp. 360-363.
Hu Xinrong, et al., "Optical System Design of Head-Mounted Display Based on Planar Waveguide of Semi-Transparent Film Array" ACTA OPTICA SINICA vol. 34, No. 9, Sep. 30, 2014, pp. 0922001-1-0922001-6.
"Office Action of China Counterpart Application", dated Jul. 27, 2020, p. 1-p. 9.
Chih-Wei Shin et al., "Head-Mounted Display Device", unpublished U.S. Appl. No. 16/691,411, filed Nov. 21, 2019.
Chih-Wei Shin et al., "Head-Mounted Display Device", unpublished U.S. Appl. No. 16/689,097, filed Nov. 20, 2019.

*Primary Examiner* — Gustavo Polo
(74) *Attorney, Agent, or Firm* — JCIPRNET

(57) ABSTRACT

A near-eye display device includes an image system and a first waveguide member. The image system is configured to provide an image beam. The first waveguide member is disposed on a transmission path of the image beam and includes a first surface, a second surface, a first light incident end, and a plurality of first light-splitting surfaces. The first light incident end is located on a side of the first surface and the second surface. The image beam enters the first waveguide member through the first light incident end. The first light-splitting surfaces are configured in a tilted manner relative to the first surface and the second surface. On a side away from the first light incident end when taking a visual axis of the direct-vision of an eye of a user as a baseline, a plurality of first gaps increase as located farther from the first light incident end.

11 Claims, 7 Drawing Sheets

NEAR-EYE DISPLAY DEVICE

BACKGROUND OF THE INVENTION

Field of the Invention

The invention relates to a display device, particularly a near-eye display device.

Description of Related Art

Near-eye displays (NED) and head-mounted displays (HMD) are the next-generation flagship products that have great potential in development. With the development of microdisplays (i.e. the tendency of higher resolution yet smaller size and lower power consumption) and cloud technology (i.e. saving the trouble of carrying a large database through having access to download massive information from cloud at any time, anywhere), heat-mounted displays become portable display devices in recent years. Apart from military use, there is also growing development of head-mounted displays in the industrial manufacturing, simulating training, three-dimensional display, medical use, sports, electronic games, etc., making head-mounted displays take up an important role.

The applications related to near-eye display technology can be divided into the augmented reality (AR) technology and the virtual reality (VR) technology so far. In the field of the augmented reality technology, relevant developers are devoted to provide high quality images under the premises of light weight and small volume of the display devices.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

A near-eye display device is provided in this invention. The near-eye display device is able to effectively reduce the situation of stripes formed on images due to the unevenness of brightness.

A near-eye display device is provided in an embodiment of the invention, including an image system and a first waveguide member. The image system is configured to provide an image beam. The first waveguide member is disposed on a transmission path of the image beam and includes a first surface, a second surface, a first light incident end, and a plurality of first light-splitting surfaces. The first surface is adapted to face an eye of a user and the second surface is disposed opposite to the first surface. The first light incident end is located on an end of the first waveguide member and the image beam enters the first waveguide member through the first light incident end. The plurality of first light-splitting surfaces are configured to dispose in a tilted manner relative to the first surface and the second surface and arrange from a side close to the first light incident end to a side far from the first light incident end. The plurality of first light-splitting surfaces reflect the image beam transmitted in the first waveguide member to the eye. A plurality of first gaps between some of the first light-splitting surfaces increase as located farther from the first light incident end, wherein the plurality of first gaps refer to gaps in a direction parallel to the first surface.

In the near-eye display device provided in the embodiment of this invention, the design of taking a visual axis of direct-vision of the eye as a baseline and the plurality of first gaps of the plurality of first light-splitting surfaces on a side far from the first light incident end increasing as located farther from the first light incident end reduces an overlapping area of two adjacent first light-splitting surfaces perceived by the eye. In this case, the problem of eye perceiving dark stripes caused by the overlapping area on the images provided by the near-eye display device can be effectively reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
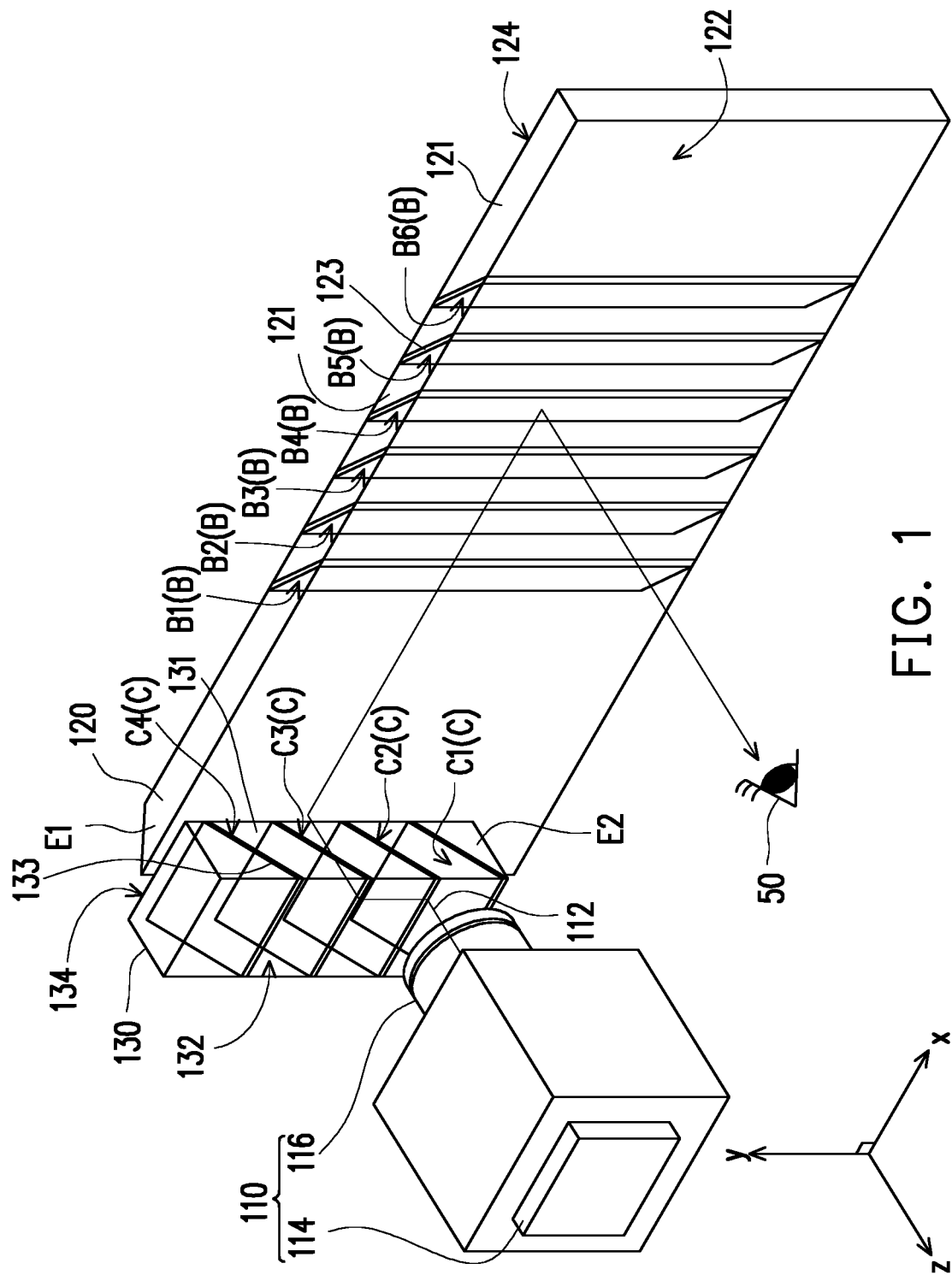
FIG. 1 is a three-dimensional schematic of a near-eye display device in an embodiment of the invention.
Figure 2:
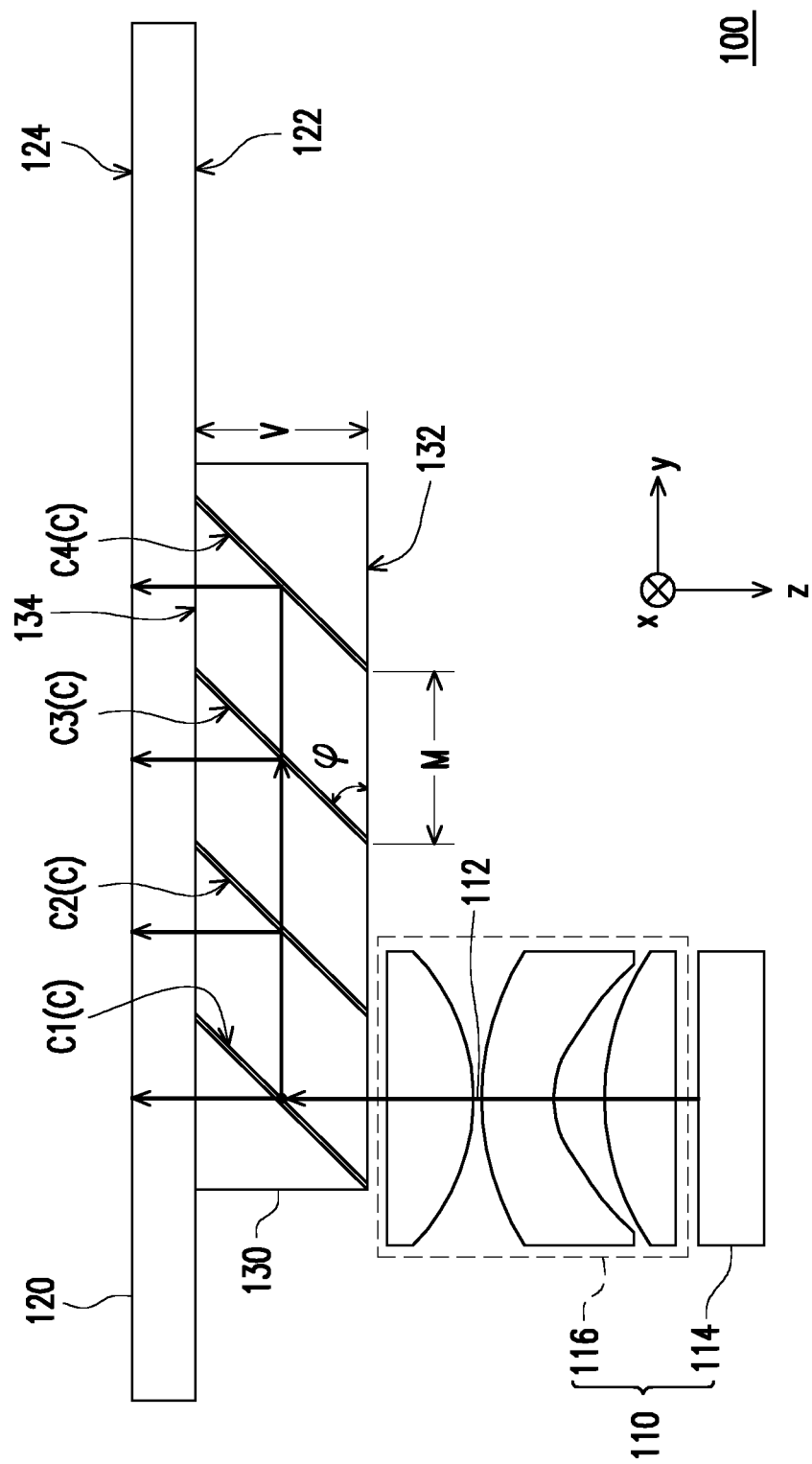
FIG. 2 is a sectional schematic of the near-eye display device of FIG. 1.
Figure 3:
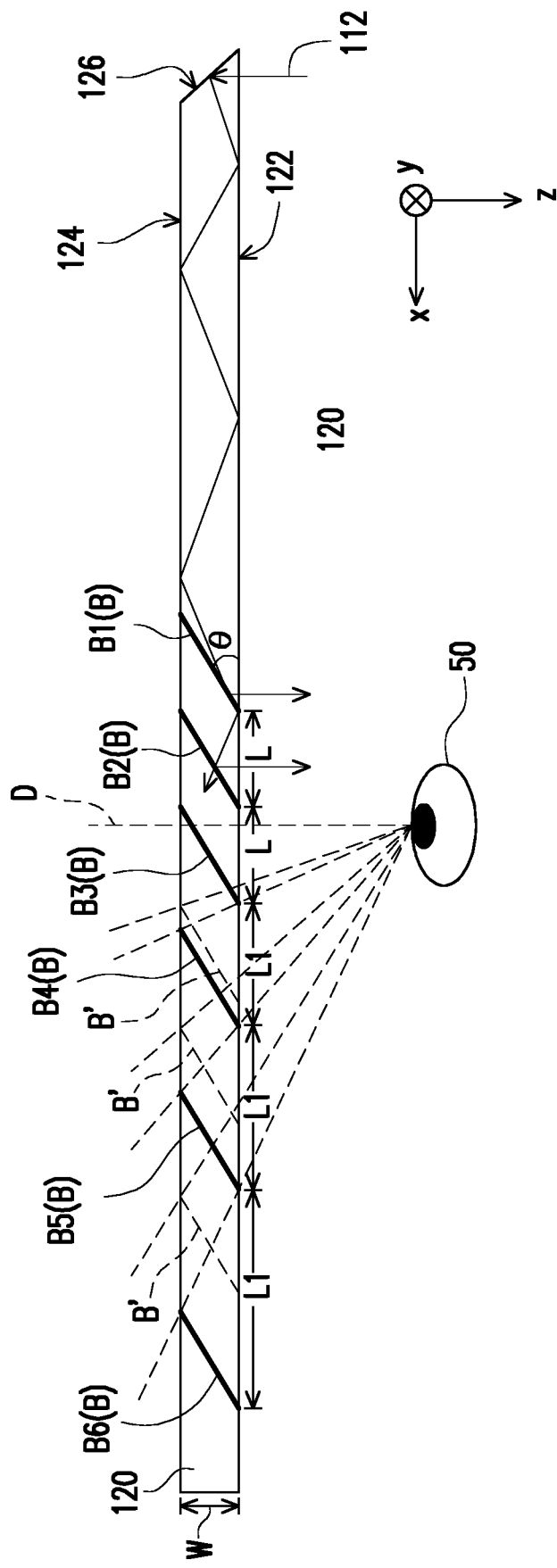
FIG. 3 is a sectional schematic showing a relation between the first waveguide member of FIG. 1 and an eye of a user.

FIG. 1 is a three-dimensional schematic of a near-eye display device in an embodiment of the invention. FIG. 2 is a sectional schematic of the near-eye display device of FIG. 1. FIG. 3 is a sectional schematic showing a relation between the first waveguide member of FIG. 1 and an eye of a user. Referring to FIG. 1 to FIG. 3, a near-eye display device 100 of this embodiment includes an image system 110 and a first waveguide member 120. The image system 110 is configured to provide an image beam 112. In this embodiment, the image system 110 includes a display 114 and a lens module 116. The display 114 is configured to provide an image beam 112. The lens module 116 is disposed on a transmission path of the image beam 112, located between the display 114 and the first waveguide member 120, and is configured to project the image beam 112 to a location of an eye 50 of a user. In addition, in this embodiment, the display 114 includes a light valve or a display panel. The light valve is, for example, a digital micro-mirror device (DMD), a liquid-crystal-on-silicon panel (LCOS panel), or any other appropriate spatial light modulator (SLM), while the display panel is, for example, a transmissive liquid-crystal panel, an organic light-emitting diode display (OLED display), a micro-light-emitting-diode display (micro-LED display), or other appropriate displays. In terms of the light valve or the display panel that cannot emit light by itself, a light-source module may be disposed to radiate onto the light valve or the display panel that cannot emit light, so as to further generate the image beam 112. In addition, the lens module 116 may include one lens or a plurality of lenses or other beam-transmission members.

The first waveguide member 120 is disposed on a transmission path of the image beam 112 and includes a first surface 122, a second surface 124, a first light incident end E1, and a plurality of first light-splitting surfaces B (six first light-splitting surfaces B1, B2, B3, B4, B5, and B6 are provided as an example in FIG. 1, the invention is not limited thereto). The first surface 122 faces the eye 50 of user and the second surface 124 is opposite to the first surface 122. The first light incident end E1 is located on an end of the first waveguide member 120. The image beam 112 enters the first waveguide member 120 through the first light incident end E1. The plurality of first light-splitting surfaces B are disposed in a tilted manner relative to the first surface 122 and the second surface 124 and arranged from a side close to the first light incident end E1 to a side far from the first light incident end E1. The plurality of first light-splitting surfaces B reflect the image beam 112 transmitted in the first waveguide member 120 to the eye 50.

In this embodiment, the near-eye display device 100 further includes a second waveguide member 130 disposed next to the first light incident end E1, located on a transmission path of the image beam 112, and located between the image system 110 and the first waveguide member 120. The second waveguide member 130 includes a third surface 132, a fourth surface 134, a second light incident end E2, and a plurality of second light-splitting surfaces C (four second light-splitting surfaces C1, C2, C3, and C4 are provided as an example in FIG. 1). The fourth surface 134 is opposite to the third surface 132 and the second light incident end E2 is located on a side of the third surface 132 and the fourth surface 134. The image beam 112 from the image system 110 enters the second waveguide member 130 through the second light incident end E2. In this embodiment, the lens module 116 is disposed on a transmission path of the image beam 112 and is located between the display 114 and the second waveguide member 130.

The plurality of second light-splitting surfaces C are configured in a tilted manner relative to the third surface 132 and the fourth surface 134 and arranged from a side close to the second light incident end E2 to a side far from the second light incident end E2. The plurality of second light-splitting surfaces C transmit the image beam 112 transmitted in the second waveguide member 130 to the first light incident end E1.

In this embodiment, the first light-splitting surfaces B and the second light-splitting surfaces C are, for example, formed by coatings that allow beams partially penetrate and partially be reflected. Coatings 123 forming the first light-splitting surfaces B are interposed in a light-guide body 121 of the first waveguide member 120. Coatings 133 forming the second light-splitting surfaces C are interposed in a light-guide body 131 of the second waveguide member 130. The light-guide body 121 of the first waveguide member 120 and the light-guide body 131 are made of, for example, transparent materials such as transparent plastic products or glass.

For instance, after the image beam 112 enters the second waveguide member 130, part of the image beam 112 penetrates the second light-splitting surface C1 and is transmitted to the first waveguide member 120, while part of the image beam 112 is transmitted to the second light-splitting surface C2. The second light-splitting surface C2 reflects part of the image beam 112 to the first waveguide member 120 and allows part of the image beam 112 penetrate to be transmitted to the second light-splitting surface C3. The second light-splitting surfaces C3 and C4 have the same function on the image beam 112 as the second light-splitting surface C2 does on the image beam 112. The description is thus omitted here. In this way, the second light-splitting surfaces C1, C2, C3, and C4 are able to sequentially transmit the image beam 112 to the first waveguide member 120. In another embodiment, it may also be the second light-splitting surface C1 reflecting part of the image beam 112 to the first waveguide member 120 and part of the image beam 112 penetrating the second light-splitting surface C1 to be transmitted to the second light-splitting surface C2 as an incident direction of the image beam 112 differs.

Referring to FIG. 3, in this embodiment, the first waveguide member 120 further includes a reflective end surface 126 located on the first light incident end E1 and connecting the first surface 122 and the second surface 124. The image beam 112 from the second waveguide member 130 enters the first waveguide member 120 through the first surface 122 at the first light incident end E1 and is reflected by the reflective end surface 126 to a direction towards the plurality of first light-splitting surfaces B. In this embodiment, the reflective end surface 126 may be formed by coating a reflective coating on a surface of the light-guide body 121.

The image beam 122 reflected by the reflective end surface 126 is transmitted in the first waveguide member 120 and transmitted to a first light-splitting surface B1. The first light-splitting surface B1 reflects part of the image beam 112 to the first surface 122. The image beam 122 then penetrates the first surface 122 and is transmitted in a direction towards the eye 50. Part of the image beam 112 penetrates the first light-splitting surface B1 and is transmitted to a first light-splitting surface B2. The first light-splitting surfaces B2, B3, B4, B5, and B6 have the same function on the image beam 112 as the first light-splitting surface B1 does on the image beam 112. The description is thus omitted here. In this way, the first light-splitting surfaces B1, B2, B3, B4, B5, and B6 are able to sequentially reflect the image beam 112 in a direction towards a direction of the eye 50.

In this embodiment, taking a visual axis D of direct-vision of the eye 50 as a baseline, a plurality of first gaps L1 of the plurality of first light-splitting surfaces B on a side far from the first light incident end E1 increase as located farther from the first light incident end E1. The plurality of first gaps L1 refer to gaps between the plurality of first light-splitting surfaces B in a direction parallel to the first surface 122. In this embodiment, the plurality of first gaps L1 are gaps in an x direction. In this embodiment, the near-eye display device 100 may be considered existing in a space constructed by x direction, y direction, and z direction. The x direction is a direction in which the plurality of first light-splitting surfaces B are arranged, the y direction is a direction in which the plurality of second light-splitting surfaces C are arranged, while the z direction is a direction perpendicular to the x direction and the y direction. The x direction is perpendicular to the y direction.

In this embodiment, a border (which, for example, extends along the y direction) of each first light-splitting surface B and the first surface 122 is perpendicular to a border (which, for example, extends along the x direction) of each second light-splitting surface C and the third surface 132. In addition, in this embodiment, the image beam 112 is linearly polarized light and a polarization direction of the image beam 112 when entering the second waveguide member 130 is parallel to an extending direction (i.e. the y direction) of a border of each first light-splitting surface B and the first surface 122.

Figure 4:
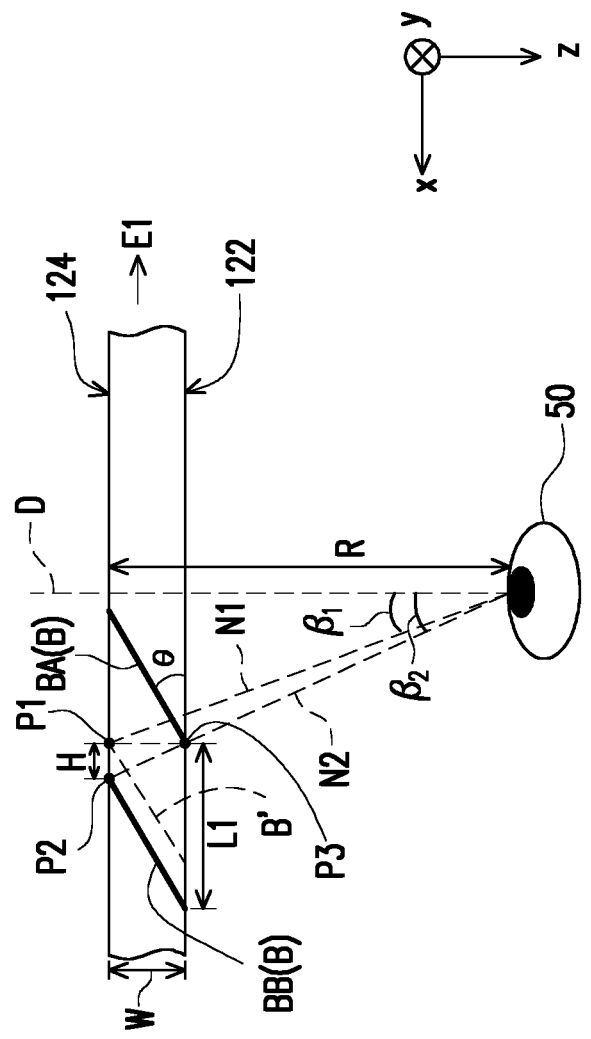
FIG. 4 is a partial sectional schematic showing a relation between the first waveguide member and an eye of a user of FIG. 3.

FIG. 4 is a partial sectional schematic showing a relation between the first waveguide member and an eye of a user of FIG. 3. Referring to FIGS. 1, 3, and 4, in this embodiment, the near-eye display device 100 satisfies H≥R(tan(β$_2$)−tan(β$_1$)), wherein taking the visual axis D of direct-vision of the eye 50 as a baseline, a first light-splitting surface closer to the first light incident end E1 and a first light-splitting surface farther from the first light incident end E1 among any two adjacent first light-splitting surfaces B on a side far from the first light incident end E1 or on the visual axis D are respectively a first A light-splitting surface BA and a first B light-splitting surface BB. H is a gap between an orthogonal-projection end P1 on the second surface 124 of an end P3 of the first A light-splitting surface BA close to the first surface 122 and an end P2 of the first B light-splitting surface BB close to the second surface 124. R is a distance from the eye 50 to the second surface 124. β$_1$ is an included angle between a connecting line N1 from the orthogonal-projection end P1 to the eye 50 and the visual axis D of direct-vision of the eye 50. β$_2$ is an included angle between a connecting line N2 from the end P3 of the first A light-splitting surface BA close to the first surface 122 to the eye 50 and a visual axis D1 of direct-vision of the eye 50. More specifically, if the first B light-splitting surface BB is disposed in a location of a dotted line B' in FIG. 4 (correspondent to a location of a dotted line B' in FIG. 3) and makes the end P2 of the first B light-splitting surface BB close to the second surface 124 coincide with the orthogonal-projection end P1, the eye 50 are able to perceive an overlapped portion of the first A light-splitting surface BA and the first B light-splitting surface BB when seeing from a visual line between the connecting line N1 and the connecting line N2. The overlapped portion results in dark stripes K of a vertical direction as in FIG. 5B on images perceived by the eye 50. However, in this embodiment, since the near-eye display device 100 satisfies H≥R(tan(β$_2$)−tan(β$_1$)), the end P2 of the first B light-splitting surface BB close to the second surface 124 happens to be on an extending line of the connecting line N2 or on the left side of the extending line of the connecting line N2. At this time, there are no overlap between the first A light-splitting surface BA and the first B light-splitting surface BB perceived by the eye 50 when the eye 50 sees along a visual line between the connecting line N1 and the connecting line N2. Hence, images perceived by the eye 50 are as FIG. 7 and do not have the dark stripes K.

In this embodiment, the near-eye display device 100 satisfies L≥W·cot(θ), wherein L is, taking the visual axis D of direct-vision of the eye 50 as a baseline, a second gap L between any two adjacent first light-splitting surfaces B on a side close to the first light incident end E1 or on the visual axis D. The second gap L refers to a gap in a direction parallel to the first surface 122, being a gap in the x direction in this embodiment. W is a distance between the first surface 122 and the second surface 124 and is also an average thickness of the first waveguide member 120. θ is a tilted angle of the any two adjacent first light-splitting surfaces B relative to the first surface 122. When the near-eye display device 100 satisfies L≥W·cot(θ), the plurality of first light-splitting surfaces B do not overlap with one another in a direction perpendicular to the first surface 122 (i.e. in the z direction in this embodiment). In this case, referring to FIG. 3, when the eye 50 directly look at or look in a direction with deviation to right in FIG. 3, the plurality of first light-splitting surfaces B do not overlap. Hence, the near-eye display device 100 allows users to see images without the dark stripes K as FIG. 7. On the other hand, the near-eye display device 100 satisfies H≥R(tan(β$_2$)−tan(β$_1$)) or L1≥W·cot(θ)+R(tan(β$_2$)−tan(β$_1$)).

Referring to FIG. 2, in this embodiment, the near-eye display device 100 satisfies M≥V·cot(φ), wherein M is a third gap M between any two adjacent second light-splitting surfaces C. The third gap M is a gap in a direction parallel to the third surface 132 (i.e. a gap in the y direction in this embodiment). V is a distance between the third surface 132 and the fourth surface 134 and is also an average thickness of the second waveguide member 130. Φ is a tilted angel of the any two adjacent second light-splitting surfaces C relative to the third surface 132. When the near-eye display device 100 satisfies M≥V·cot(φ), the plurality of the second light-splitting surfaces C do not overlap in a direction perpendicular to the third surface 132 (i.e. in the z direction in this embodiment). In this case, images provided by the near-eye display device 100 do not have horizontal dark stripes K' as in FIG. 6, but the near-eye display device 100 provides images without the dark stripes K' as FIG. 7.

In addition, ambient light from external objects (i.e. objects on a side which the second surface 124 faces) may penetrate the first waveguide member 120 and be transmitted to the eye 50 of a user, wherein the ambient light may penetrate the light-guide body 121 and partially penetrate the first light-splitting surfaces B. In this way, users are able to simultaneously perceive display images provided by the near-eye display device 100 and the external objects, such that an effect of augmented reality is achieved.

Figure 5A:
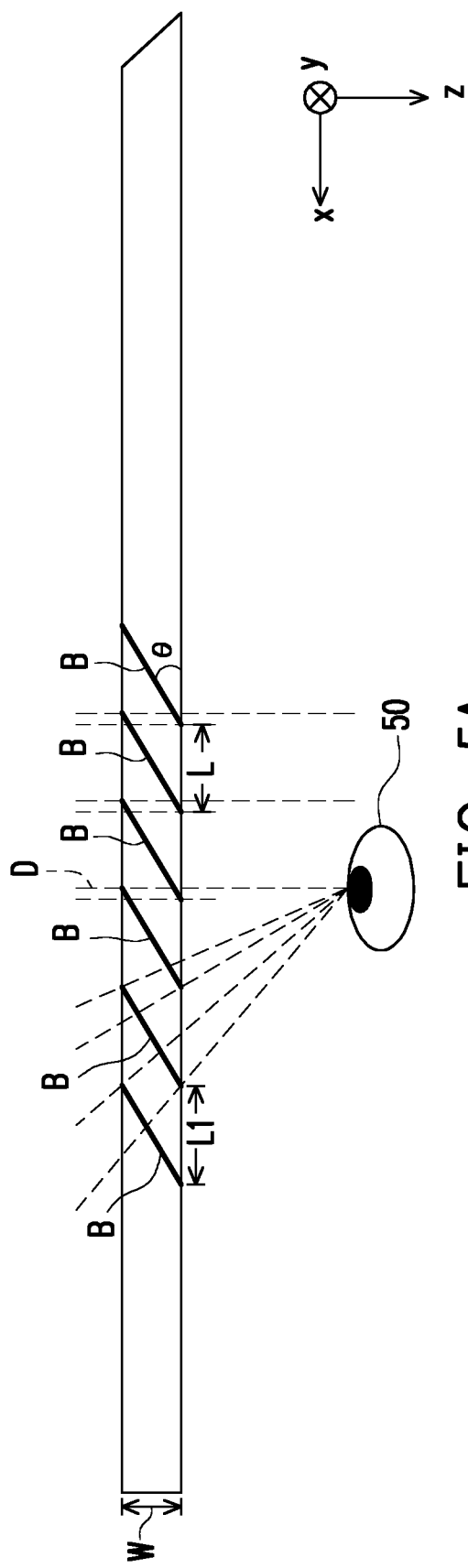
FIG. 5A is a sectional schematic showing a relation between a first waveguide member in a comparative embodiment and an eye of a user.
Figure 5B:
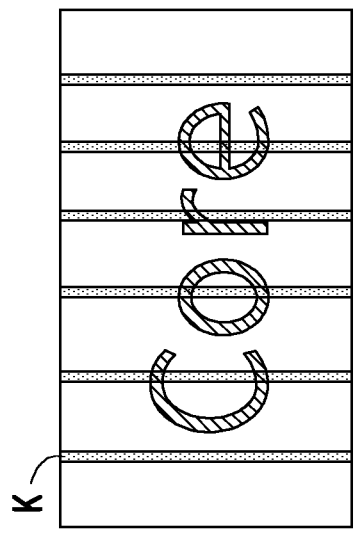
FIG. 5B is an image provided by the near-eye display device in the comparative embodiment of FIG. 5A.

FIG. 5A is a sectional schematic showing a relation between a first waveguide member in a comparative embodiment and an eye of a user, and FIG. 5B is an image provided by the near-eye display device in the comparative embodiment of FIG. 5A. Referring to FIG. 5A and FIG. 5B, in this comparative embodiment, a near-eye display device does not satisfy $H \geq R(\tan(\beta_2) - \tan(\beta_1))$. Hence, in a visual direction with deviation to left of the visual axis D of direct-vision of the eye 50, adjacent first light-splitting surfaces B partially overlap in the visual direction. Since the plurality of first light-splitting surfaces B function on an image beam twice in an overlapping area, vertical dark stripes K as in FIG. 5B are generated on images. On the other hand, in this embodiment, adjacent first light-splitting surfaces B partially overlap in the z direction since the near-eye display device does not satisfy $L \geq W \cdot \cot(\theta)$. Hence, the vertical dark stripes K as in FIG. 5B are generated on images.

Upon comparison, the near-eye display device 100 in the embodiment in FIG. 1 to FIG. 4 satisfies $H \geq R(\tan(\beta_2) - \tan(\beta_1))$ and $L \geq W \cdot \cot(\theta)$. Hence, the near-eye display device 100 is able to provide images without the vertical dark stripes K as FIG. 7.

Figure 6A:
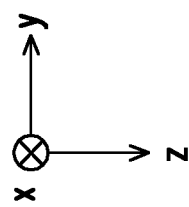
FIG. 6A is a sectional schematic showing a relation between a second waveguide member in another comparative embodiment and an eye of a user.
Figure 6A:
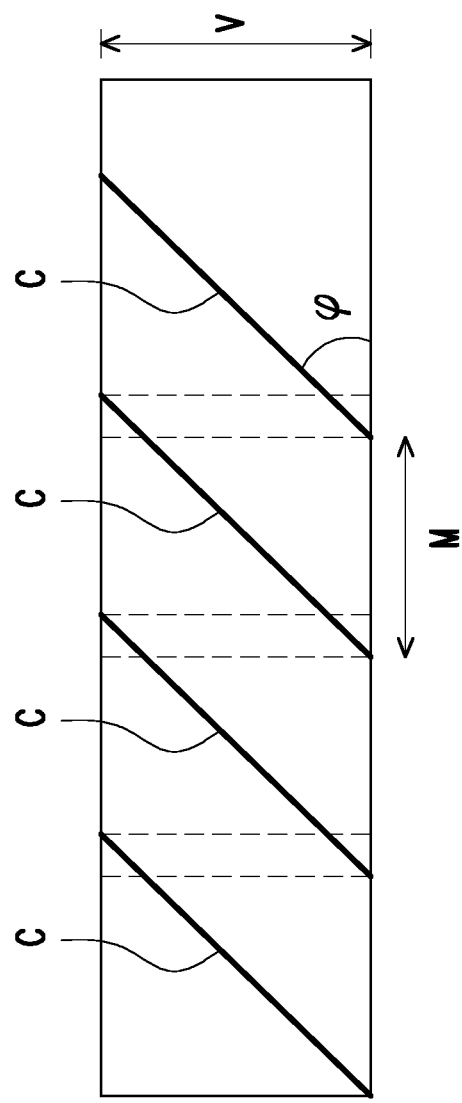
Figure 6B:
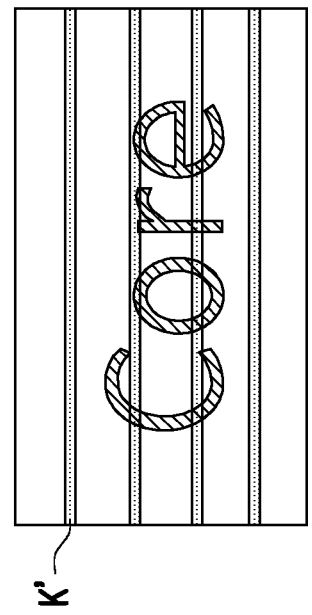
FIG. 6B is an image provided by the near-eye display device in the comparative embodiment of FIG. 6A.

FIG. 6A is a sectional schematic showing a relation between a second waveguide member in another comparative embodiment and an eye of a user, and FIG. 6B is an image provided by the near-eye display device in the comparative embodiment of FIG. 6A. Referring to FIG. 6A and FIG. 6B, in this embodiment, a near-eye display device does not satisfy $M \geq V \cdot \cot(\varphi)$. Hence, the plurality of second light-splitting surfaces C partially overlap in the z direction. Since the plurality of the first light-splitting surfaces B function on an image beam twice in an overlapping area, horizontal dark stripes K' as in FIG. 6B are generated on images.

Upon comparison, the near-eye display device 100 in the embodiment in FIG. 1 to FIG. 4 satisfies $M \geq V \cdot \cot(\varphi)$. Hence, the near-eye display device 100 is able to provide images without the horizontal dark stripes K' as FIG. 7.

Figure 7:
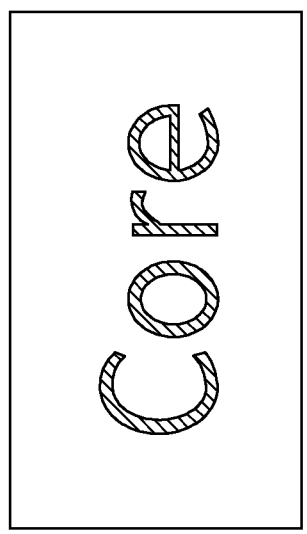
FIG. 7 is an image provided by the near-eye display device in the embodiment of FIG. 1 to FIG. 4.

In conclusion of the above, one can know that the near-eye display device 100 in the embodiment in FIG. 1 to FIG. 4 is able to provide images without the horizontal dark stripes K' and the vertical dark stripes K as FIG. 7. Hence the near-eye display device 100 may effectively improve the situation of stripes being formed on images due to the unevenness of brightness and further even up the brightness of the images perceived by the eye of users.

In conclusion of the above, in the near-eye display device provided in the embodiments of this invention, the design of taking a visual axis of direct-vision of the eye as a baseline and the plurality of first gaps on a side far from the first light incident end increasing as located farther from the first light incident end reduces an overlapping area of two adjacent first light-splitting surfaces perceived by eye. In this case, the problem of the eye perceiving dark stripes caused by the overlapping area on the images provided by the near-eye display device can be effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A near-eye display device comprising:
an image system configured to provide an image beam; and
a first waveguide member disposed on a transmission path of the image beam and comprising:
a first surface adapted to face an eye of a user;
a second surface disposed opposite to the first surface;
a first light incident end located on an end of the first waveguide member, wherein the image beam enters the first waveguide member through the first light incident end; and
a plurality of first light-splitting surfaces configured to dispose in a tilted manner relative to the first surface and the second surface and arrange from a side close to the first light incident end to a side far from the first light incident end, wherein the plurality of first light-splitting surfaces reflect the image beam transmitted in the first waveguide member to the eye, and wherein a plurality of first gaps between some of the plurality of first light-splitting surfaces increase as located farther from the first light incident end, and the plurality of first gaps refer to gaps in a direction parallel to the first surface, wherein the near-eye display device satisfies L≥W·cot(θ), where L is, taking a visual axis of direct-vision of the eye as a baseline, a second gap between any two adjacent first light-splitting surfaces on a side close to the first light incident end or on the visual axis, the second gap refers to a gap in a direction parallel to the first surface, W is a distance between the first surface and the second surface, θ is a tilted angle of the any two adjacent first light-splitting surfaces relative to the first surface.

2. The near-eye display device of claim 1, wherein the near-eye display device satisfies H≥R(tan(β₂)−tan(β₁)), where taking a visual axis of direct-vision of the eye as a baseline, a first light-splitting surface closer to the first light incident end and a first light-splitting surface farther from the first light incident end among any two adjacent first light-splitting surfaces on a side far from the first light incident end or on the visual axis are respectively a first A light-splitting surface and a first B light-splitting surface, H is a gap between an orthogonal-projection end on the second surface of an end of the first A light-splitting surface close to the first surface and an end of the first B light-splitting surface close to the second surface, R is a distance from the eye to the second surface, β₁ is an included angle between a connecting line from the orthogonal-projection end to the eye and the visual axis of direction-vision of the eye, β₂ is an included angle between a connecting line from the end of the first A light-splitting surface close to the first surface to the eye and the visual axis of direct-vision of the eye.

3. The near-eye display device of claim 1, wherein the plurality of first light-splitting surfaces do not overlap with one another in a direction perpendicular to the first surface.

4. The near-eye display device of claim 1 further comprising a second waveguide member disposed next to the first light incident end, located on a transmission path of the image beam, and located between the image system and the first waveguide member, the second waveguide member comprising:
   a third surface;
   a fourth surface opposite to the third surface;
   a second light incident end located on a side of the third surface and the fourth surface, wherein the image beam from the image system enters the second waveguide member through the second light incident end; and
   a plurality of second light-splitting surfaces configured to dispose in a tilted manner relative to the third surface and the fourth surface and arrange from a side close to the second light incident end to a side far from the second light incident end, wherein the plurality of second light-splitting surfaces transmit the image beam transmitted in the second waveguide member to the first light incident end.

5. The near-eye display device of claim 4, wherein the near-eye display device satisfies M≥V·cot(φ), wherein M is a third gap between any two adjacent second light-splitting surfaces, the third gap refers to a gap in a direction parallel to the third surface, V is a distance between the third surface and the fourth surface, and φ is a tilted angle of the any two adjacent second light-splitting surfaces relative to the third surface.

6. The near-eye display device of claim 4, wherein the plurality of second light-splitting surfaces do not overlap with one another in a direction perpendicular to the third surface.

7. The near-eye display device of claim 4, wherein a border of each first light-splitting surface of the plurality of first light-splitting surfaces and the first surface is perpendicular to a border of each second light-splitting surface of the plurality of second light-splitting surfaces and the third surface.

8. The near-eye display device of claim 7, wherein the image beam is linearly polarized light, and a polarization direction of the image beam entering the second waveguide member is parallel to an extending direction of a border of each first light-splitting surface of the plurality of first light-splitting surfaces and the first surface.

9. The near-eye display device of claim 1, wherein the first waveguide member further comprises a reflective end surface located on the first light incident end and connecting the first surface and the second surface, the image beam enters the first waveguide member through the first surface at the first light incident end and is reflected by the reflective end surface to the plurality of first light-splitting surfaces.

10. The near-eye display device of claim 1, wherein the image system comprises:
    a display configured to provide the image beam; and
    a lens module disposed on a transmission path of the image beam, located between the display and the first waveguide member, and configured to project the image beam in the eye.

11. The near-eye display device of claim 9, wherein the display comprises a light valve or a display panel.

* * * * *